(12) United States Patent  
Baney

(10) Patent No.: US 9,100,129 B2
(45) Date of Patent: Aug. 4, 2015

(54) OPTICAL COHERENT RECEIVER WITH LOCAL OSCILLATOR LASER HAVING HYBRID CAVITY

(71) Applicant: Keysight Technologies, Inc., Minneapolis, MN (US)

(72) Inventor: Douglas Baney, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 164 days.

(21) Appl. No.: 13/716,322

(22) Filed: Dec. 17, 2012

(65) Prior Publication Data

US 2013/0170843 A1 Jul. 4, 2013

Related U.S. Application Data

(60) Provisional application No. 61/580,692, filed on Dec. 28, 2011.

(51) Int. Cl.
*H04B 10/61* (2013.01)

(52) U.S. Cl.
CPC .............. *H04B 10/61* (2013.01); *H04B 10/614* (2013.01); *H04B 10/615* (2013.01)

(58) Field of Classification Search
CPC ....................................................... H04B 10/61
USPC ............................................ 372/20; 385/33
See application file for complete search history.

(56) References Cited

U.S. PATENT DOCUMENTS

| | | | | |
|---|---|---|---|---|
| 5,175,643 A | * | 12/1992 | Andrews | 359/339 |
| 5,602,864 A | * | 2/1997 | Welch et al. | 372/50.11 |
| 5,696,779 A | | 12/1997 | Welch et al. | |
| 2004/0105480 A1 | * | 6/2004 | Sidorin et al. | 372/97 |
| 2009/0142051 A1 | * | 6/2009 | Shpantzer et al. | 398/25 |
| 2009/0142077 A1 | * | 6/2009 | Taylor | 398/208 |
| 2010/0142567 A1 | * | 6/2010 | Ward et al. | 372/20 |
| 2011/0142449 A1 | * | 6/2011 | Xie | 398/65 |
| 2012/0076506 A1 | * | 3/2012 | Goebuchi et al. | 398/202 |
| 2012/0148192 A1 | * | 6/2012 | Nakanishi | 385/33 |

FOREIGN PATENT DOCUMENTS

EP 2330758 A1 6/2011

OTHER PUBLICATIONS

F. Favre et al., "External-cavity semiconductor laser with 15 nm continuous tuning range", Electronics Letters, vol. 22, Issue: 15 Publication Year: Jul. 17, 1986, pp. 795-796.

A. Laurent et al., "Double external cavity laser diode for DWDM applications", Journal of Optics A: Pure and Applied Optics, vol. 2 No. 1, (2000) pp. L6-L8.

A. Lohmann et al., "External Cavity Laser With a Vertically Etched Silicon Blazed Grating", IEEE Photonics Technology Letters, vol. 15, No. 1, Jan. 2003, pp. 120-122.

\* cited by examiner

*Primary Examiner* — David Payne
*Assistant Examiner* — Omar S Ismail

(57) ABSTRACT

A coherent optical receiver includes a local oscillator (LO) laser configured to provide an LO signal. The LO laser includes a hybrid external cavity and an active gain medium within the hybrid external cavity, where the LO laser is defined between a first optical reflector on a chip including the active gain medium and a second optical reflector not on the chip.

15 Claims, 2 Drawing Sheets

OPTICAL COHERENT RECEIVER WITH LOCAL OSCILLATOR LASER HAVING HYBRID CAVITY

PRIORITY STATEMENT

Priority is claimed under 35 U.S.C. §119(e) from provisional patent application No. 61/580,692, filed Dec. 28, 2011, in the United States Patent and Trademark Office, the disclosure of which is hereby incorporated by reference in its entirety.

BACKGROUND

An optical coherent receiver includes a local oscillator (LO) laser for generating an LO signal at an LO frequency. The LO signal is added to a received input optical signal at a carrier frequency, and the combined lightwave is detected by a photodetector. The photodetector outputs a detected signal at an intermediate frequency (IF), which may be the sum or the difference between the LO frequency and carrier frequency. The IF contains information on the amplitude, polarization and phase encoding of the input optical signal. Optical coherent receivers may be substantially integrated, e.g., on a semiconductor chip, for various applications, particularly in the telecommunications and test and measurement industries. An integrated optical coherent receiver reduces the cost and complexity of signal reception and analysis of amplitude, phase and polarization modulated optical signals used in modern photonic transport networks.

Conventional integrated optical coherent receivers include the LO laser and corresponding laser cavity on the same chip as the other receiver components, such as semiconductor optical amplifiers (SOAs), waveguides, optical hybrid and photodetectors. An on-chip LO laser is typically a tunable sampled-grating distributed Bragg reflector (SG-DBR) laser. Although an on-chip laser cavity reduces overall size of the integrated optical coherent receiver, the phase noise reduces the receiver performance.

The LO laser is a key component of an optical coherent receiver. The phase and intensity noise properties of the LO laser generally govern performance of the optical coherent receiver. The phase noise in particular impacts minimum bit rates and the complexity of the phase modulation that may be applied to the input optical signal, while maintaining good reception. When the phase of the LO laser varies due to phase noise in the LO laser cavity, it imparts the variation on the receiver signals, including the input optical signal and detected signals, which leads to error in estimated signaling phase, for example. Efforts to improve the phase noise of LO lasers in integrated receivers include running at higher power levels, to the extent that rebroadening of the laser linewidth does not occur. Also, injection locking is used, where the LO laser is locked to a reference laser source with lower phase noise, where the reference laser source is off-chip.

SUMMARY

In a representative embodiment, a coherent optical receiver includes a local oscillator (LO) laser configured to provide an LO signal. The LO laser includes a hybrid cavity and an active gain medium within the hybrid cavity, the LO laser being defined between an interior first optical reflector on a chip including the active gain medium and an external second optical reflector not on the chip.

In another representative embodiment, an LO laser is provided for a coherent optical receiver, including an optical coupling system for adding an input optical signal with an LO signal from the LO laser and multiple photodetectors. The LO laser includes a semiconductor chip having an active gain medium of the LO laser, a first optical reflector formed on the semiconductor chip, a second optical reflector not on the semiconductor chip, and a beam directing element located between the active gain medium and the second optical reflector. The first and second optical reflectors define a hybrid external cavity containing the active gain medium. The beam directing element is configured to focus optical signals reflected from the second optical reflector into a waveguide coupled to the active gain medium, enabling laser action to provide the LO signal to the optical coupling system.

In yet another representative embodiment, a coherent optical receiver includes an LO laser configured to provide an LO signal, the LO laser having a main cavity, a coupling cavity, and an active gain medium within at least the main cavity. The main cavity is defined between first and second optical reflectors on a chip including the active gain medium. The coupling cavity is defined by the first optical reflector and a third optical reflector not on the chip, the third optical reflector reflecting an optical signal coupled from the main cavity back into the main cavity after a time-delay.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
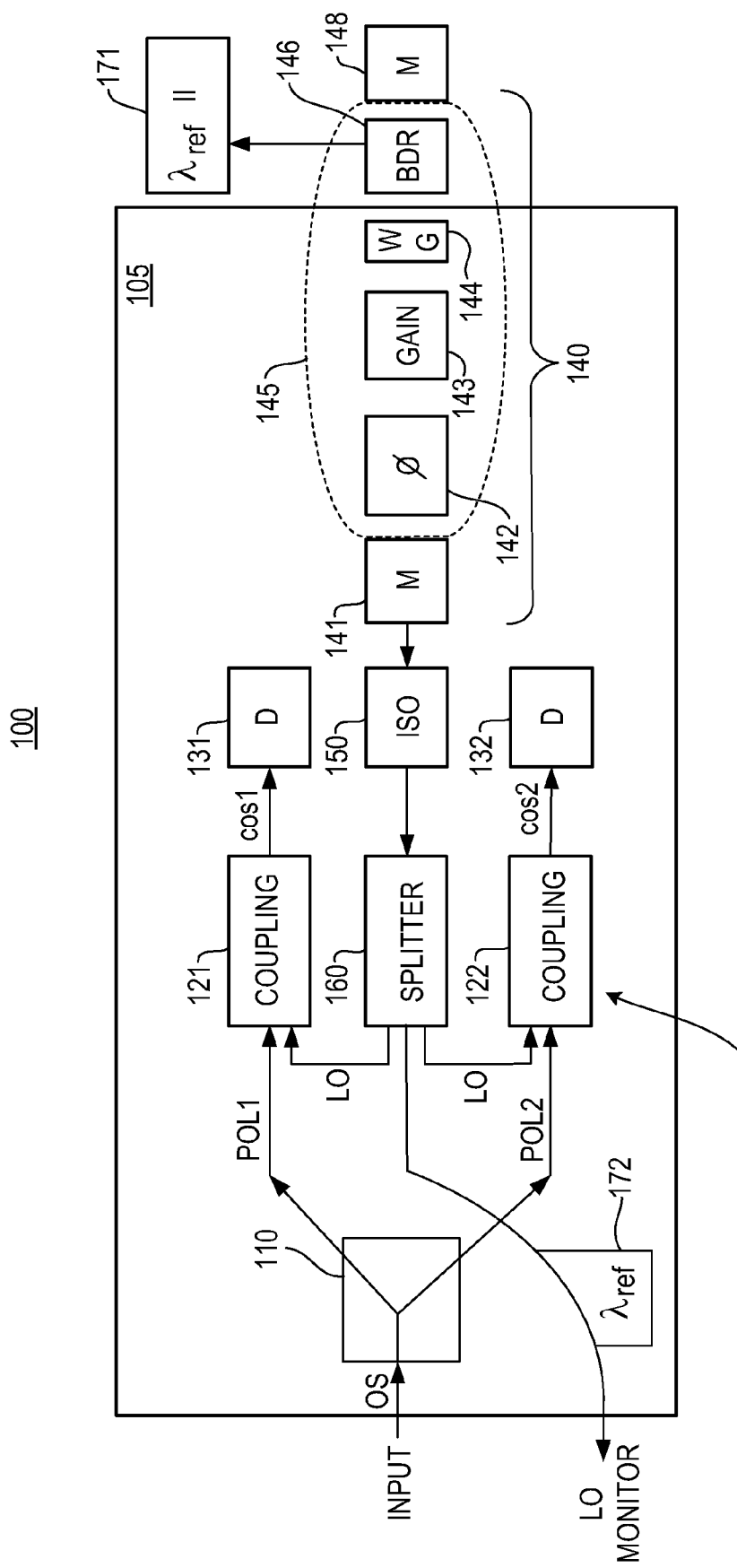
FIG. 1 is a block diagram illustrating an optical coherent receiver including a local oscillator (LO) laser with a hybrid cavity, according to a representative embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

Generally, various representative embodiments provide a coherent optical receiver that includes a local oscillator (LO) laser configured to provide an LO signal. The LO laser is formed in part on a chip, the material of which provides an active gain medium for the LO laser. The LO laser includes a hybrid cavity defined between a first optical reflector formed interior to the chip and a second optical reflector not formed on the chip, the active gain medium being included within the hybrid cavity. By providing the first optical reflector interior to the chip with the active gain medium and at least the second optical reflector off-chip, the phase noise (and linewidth) of the LO laser is reduced, improving performance of the coherent optical receiver.

FIG. 1 is a block diagram illustrating an optical coherent receiver including a LO laser with a hybrid cavity, according to a representative embodiment.

Referring to FIG. 1, optical coherent receiver 100 is formed in part on chip 105, which may be formed of any appropriate substrate material or semiconductor material, such as indium phosphide (InP), silicon (Si), or gallium arsenide (GaAs), or hybrids of various materials, for example. Notably, the material of which the chip 105 is formed includes active optical elements and/or is capable of providing optical gain. The optical coherent receiver 100 includes polarization splitter 110, optical coupling system 120, first and second photodetectors 131 and 132, LO laser 140, optical isolation section 150 and splitter 160.

In the depicted embodiment, the optical coherent receiver 100 is integrated, in that the polarization splitter 110, the optical coupling system 120, the first and second photodetectors 131 and 132, and a portion of the LO laser 140 (particularly including active gain medium 143) are formed on or as part of the chip 105 ("on-chip"). However, unlike conventional optical coherent receivers, the LO laser 140 is not a SG-DBR laser. Rather, the LO laser 140 has a hybrid cavity 145 formed partially interior to the chip 105 and partially off of the chip 105 ("off-chip").

More particularly, in the depicted embodiment, the LO laser 140 includes interior first optical reflector 141, phase controller 142, active gain medium 143 and waveguide 144 formed on-chip, and beam directing element 146 and external or off-chip second optical reflector 148 formed off-chip (and coupled to the active gain medium 143). The off-chip components may be formed in a medium that does not include active optical elements and is not capable of providing optical gain, such as free space, glass or glass fiber, for example. The hybrid cavity 145 is defined between the on-chip interior first optical reflector 141 and the second optical reflector 148. Incorporation of the hybrid cavity 145 is contrary to the trend toward higher integration, since it requires an increase in overall size of the optical coherent receiver 100 (although use of on-chip space is reduced). However, the hybrid cavity 145 provides reduction in phase noise of the LO laser 140.

In external cavity configurations, such as those offered commercially by Agilent Technologies, Inc., the linewidth, in the absence of FM jitter, is of the order of 10 kHz, offering greater then 100 times narrower linewidth than SG-DBR lasers that have linewidths of the order of 10 MHz. This linewidth reduction is in part due to the transmission properties of the passive section of the laser not being influenced by carrier fluctuations within the active portion of the cavity. For example spontaneous emission within the active section as a result of carrier recombination alters the phase of the optical wave, however; additional linewidth enhancement occurs due to index perturbations in the active cavity following the spontaneous emission event leading to recovery of the carrier density in the laser. The memory properties, and dispersion, associated with the passive section, serve to reduce the laser linewidth.

An input optical signal OS is received at input waveguide 115, and may be amplified by an on-chip semiconductor optical amplifier (SOA) (not shown). The input optical signal OS has a carrier frequency that would typically be in the range of about 200,000 GHz, consistent with the low loss regions of the optical transport glass. The input optical signal OS is split by the polarization splitter 110 into first and second polarized signals POL1 and POL2, where the second polarized signal POL2 is a 90 degree rotation of the first polarized signal POL1 In an alternative embodiment, the input optical signal OS polarization components are converted similarly to either the usual transverse-electric (TE) or transverse-magnetic (TM) signals by the polarization splitter 110.

In the depicted embodiment, the optical coupling system 120 includes first and second couplers 121 and 122, and may further include corresponding waveguides and SOAs (not shown), for example. The first polarized signal POL1 is coupled with the LO signal at the first coupler 121, and the second polarized signal POL2 is coupled with the LO signal at the second coupler 122 within the optical coupling system 120. The first and second couplers 121 and 122 may be multimode interference (MMI) couplers, well know in the art, configured to add the first and polarized signals POL1 and POL2 with the LO signal, respectively, although other configurations using various planar couplers or out-of-plane grating-assisted signal coupling, may be incorporated, as well known in the art, without departing from the scope of the present teachings. The LO signal is output by the LO laser 140 through the optical isolation section 150, the splitter 160 and associated waveguides (not shown). The optical isolation section 150 reduces the effects of optical feedback on the hybrid cavity 145, and the splitter 160 splits the LO signal to be input into each of the first and second couplers 121 and 122. The splitter 160 may be a MMI coupler, for example.

The first photodetector 131 detects the first combined optical signal COS1 output by the first coupler 121 to provide first IF signal, and the second photodetector 132 detects the second combined optical signal COS2 output by the second coupler 122 to provide second IF signal. The first and second IF signals may be taken of with electrical connections, for example. In the depicted embodiment, the first and second photodetectors 131 and 132 are integrated, in that they are formed on the chip 105 and they may be composed of photodetector pairs to form a balanced detection arrangement for reduction of intensity noise and signals that may interfere with the desired coherent detection. Alternatively, one or both of the first and second photodetectors 131 and 132 may be included off-chip, without departing from the scope of the present teachings.

In an alternative embodiment, the optical coupling system 120 may be implemented as a 90 degree optical hybrid formed on the chip 105. The optical hybrid in an embodiment includes multiple MMI couplers, along with corresponding waveguides, SOAs and phase shifters (not shown), as would be apparent to one of ordinary skill in the art. Other optical hybrid arrangements are possible using star couplers and other coupling devices. For example, the optical hybrid may have a first MMI coupler configured to add the input optical signal OS and the LO signal output by LO laser 140 to provide multiple combined optical signals. The optical hybrid may further include a second MMI coupler configured to couple the combined optical signals with multiple photodetectors, respectively. For example, the optical hybrid may produce four outputs provided to four single-ended photodetectors, respectively, where the four outputs would be the sum of the first polarized signal POL1 and the LO signal, the difference between the first polarized signal POL1 and the LO signal, the sum of the first polarized signal POL1 and the LO signal with a 90 degree phase advance, and the difference between the first polarized signal POL1 and the LO signal with a 90 degree phase lag.

As discussed above, the LO laser 140 includes the hybrid cavity 145 formed between the interior first optical reflector 141 and the second optical reflector 148. The interior first optical reflector 141 may be a simple mirror, a variable longitudinal-position mirror, a displacement mirror, a sampled DBR, a mirror realized through refractive index changes along an optical propagation direction, or a broadband mirror such as implemented with a photonic crystal, for example. A variable longitudinal-position mirror maintains the cavity mode as the external reflector (e.g., second optical reflector 148) tunes in frequency. For example, as the external reflector tunes to higher optical frequency, the longitudinal-position mirror moves toward the gain section (e.g., active gain medium 143) to shorten the cavity to retain continuous tuning, i.e., there are no jumps in optical phase as the cavity tunes in optical frequency. The second optical reflector 148 may be a band pass reflective mirror, a frequency selection filter or a diffraction grating, for example, which may be tunable. Also, the second optical reflector 148 may be a broadband mirror, for example, which requires no tuning. In an embodiment, the interior first optical reflector 141 may be configured to reflect waveforms having multiple frequency comb lines spaced at predetermined intervals, where the frequency comb lines are individually selectable by the second optical reflector 148. That is, the second optical reflector 148 may be configured to reflect one frequency (or narrow frequency band), which may be predetermined or tunable (e.g., when the second optical reflector 148 is a tunable band reflector). The frequency aligns with one of the frequency comb lines, and thus an optical signal at the corresponding wavelength is reflected, causing it to resonate in the hybrid cavity 145.

The phase controller 142, the active gain medium 143, the waveguide 144, and the beam directing element 146 are located within the hybrid cavity 145. The active gain medium 143 is such as to compensate for cavity losses, including mirror and propagation losses to achieve laser operation, as is typical in laser design. Although FIG. 1 depicts the phase controller 142, the active gain medium 143 and the waveguide 144 on-chip, and the beam directing element 146 off-chip, it is understood that the various components may be arranged on-chip or off-chip in alternative configurations, without departing from the scope of the present teachings. Also, the phase controller 142 may be positioned anywhere within the hybrid cavity 145 (e.g., not necessarily between the active gain medium 143 and the interior first optical reflector 141). Generally, the phase controller 142 allows for phase adjustment in the hybrid cavity 145 to help achieve desired operation at a set laser frequency. The active gain medium 143 is formed from the material of the chip 105, and provides optical gain of the reflected optical signal resonating in the hybrid cavity 145. Waveguide 144 may be a tilted waveguide interface at the edge of the chip 105, for example, configured to reduce back-coupling of reflection from the chip edge to the gain medium 143. The chip edge may also be covered with an optically non-reflective coating to further reduce reflection effects, such as lowering edge reflection.

In the depicted embodiment, the beam directing element 146 is located off-chip, along with the second optical reflector 148. The beam directing element 146 may be a collimating lens, for example, that provides a collimated optical signal (beam of light) to the second optical reflector 148 and focuses the reflected optical signal from the second optical reflector 148 back into the waveguide 144. This feedback enables resonating laser action for providing the LO signal to the optical coupling system 120. The beam directing element 146 may be various alternative devices capable of directing the reflected optical signal into the waveguide 144, without departing from the scope of the present teachings. In an embodiment, the beam directing element 146 provides a tap for a wavelength reference, indicated by wavelength reference 171. The wavelength reference 171 enables measurement of the LO laser 140 to provide correction to the operating wavelength, either through physical signals modifying the wavelength tuning of the LO laser 140 or through correction of the received signals with the aid of a computation device, for example.

As mentioned above, the reflected optical signal exits the hybrid cavity 145 as the LO signal through the optical isolation section 150 into the splitter 160. In the depicted embodiment, the splitter 160 is a three-way splitter, providing the LO signal to the first coupler 121, the second coupler 122, and an LO monitor output indicated by wavelength reference 172. The wavelength reference 172 enables monitoring of the amount of LO power produced by the LO laser 140. The wavelength reference 172 provides wavelength information for the hybrid cavity 145, and may be implemented using a waveguide-based discriminator, a dielectric filter discriminator, molecular absorption cells, or atomic absorption cells, for example, which are stable. Various types of waveguide-based discriminators include Fabry-Perot, a ring resonator, Mach-Zehnder and Michelson discriminators, for example. In an embodiment, the wavelength reference 172 may include one or more of on-chip ring resonators, each having a corresponding prescribed resonant frequency, loosely coupled to output waveguides from the splitter 160 and directed to integrated detection elements.

As mentioned above, the off-chip components of the hybrid cavity 145 enable reflection of a specific wavelength of light back into the waveguide 144. This configuration allows linewidth reduction, which enables better performance of the optical coherent receiver 100 over conventional approaches, e.g., using integrated SG-DBR lasers. For example, linewidth may be reduced from about 10 MHz, common in conventional optical coherent receivers having integrated SG-DBR laser LOs, to about 100 kHz or less.

Figure 2:
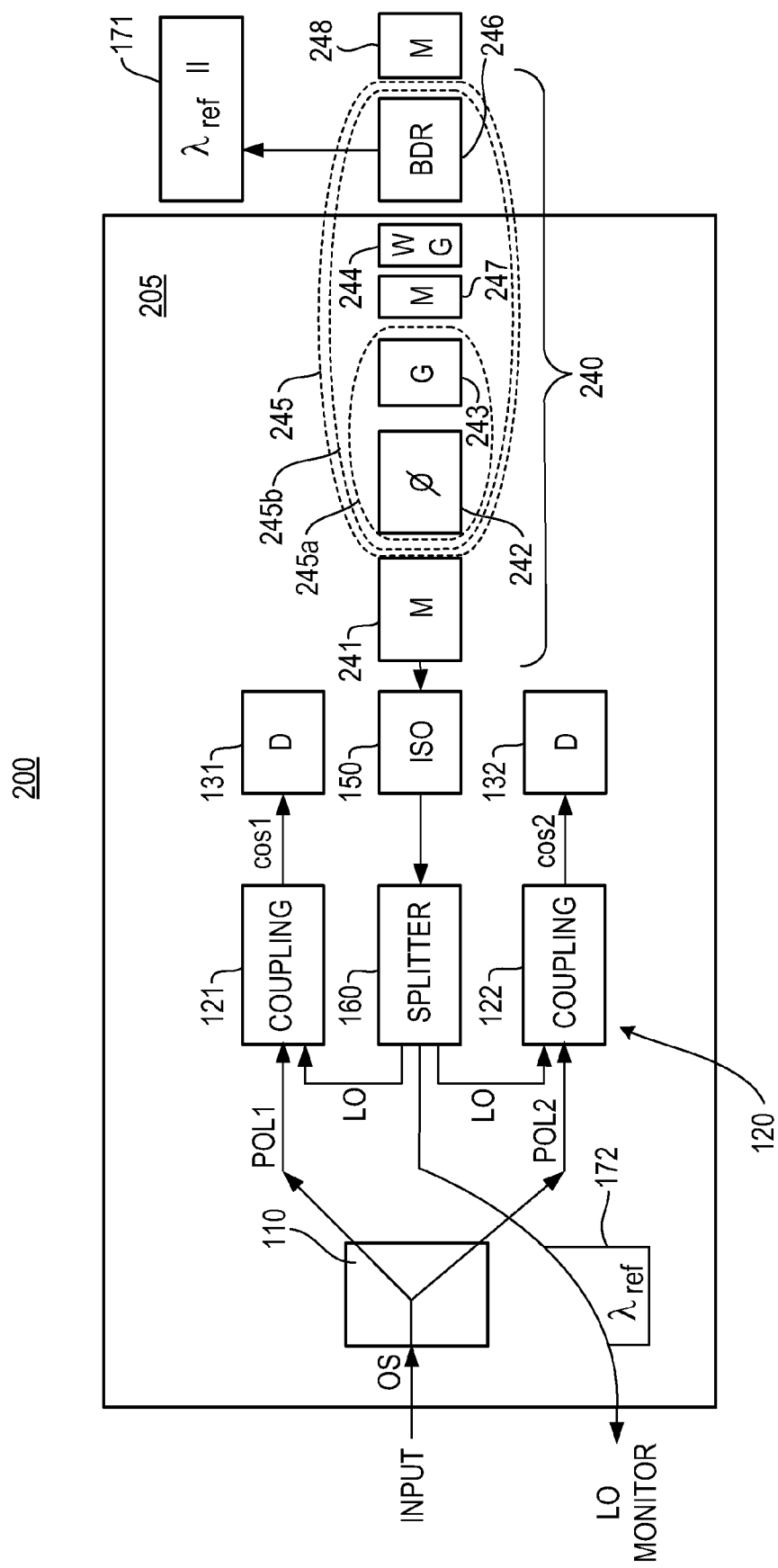
FIG. 2 is a block diagram illustrating an optical coherent receiver including an LO laser with an extended hybrid cavity, according to a representative embodiment.

FIG. 2 is a block diagram illustrating an optical coherent receiver including a LO laser with an extended hybrid cavity, according to a representative embodiment.

Referring to FIG. 2, optical coherent receiver 200 is formed in part on chip 205, which may be formed of any appropriate substrate material or semiconductor material, such as InP, Si, or GaAs, for example. The material of which the chip 205 is formed includes active optical elements and/or is capable of providing optical gain. The optical coherent receiver 200 includes polarization splitter 110, optical coupling system 120, first and second photodetectors 131 and 132, optical isolation section 150 and splitter 160, which are substantially the same as discussed above with reference to FIG. 1, and therefore the descriptions will not be repeated.

The optical coherent receiver 200 further includes LO laser 240, which has an extended hybrid cavity 245 including three optical reflectors: interior first optical reflector 241 and interior second optical reflector 247 formed on the chip 205 with active gain medium 243, and external third optical reflector 248 not formed on the chip 205. In the depicted embodiment, the LO laser 240 further includes phase controller 242, the active gain medium 243 and waveguide 244 formed on-chip, and beam directing element 246 formed off-chip. The off-chip components may be formed in a medium that does not include active optical elements and is not capable of providing optical gain, such as free space, glass or glass fiber, for example.

The extended hybrid cavity 245 includes main cavity 245a and coupling cavity 245b. The main cavity 245a is defined between the on-chip first and second optical reflectors 241 and 247. The coupling cavity 245b is a hybrid cavity defined between the on-chip first optical reflector 241 and the off-chip third optical reflector 248. The first and second optical reflectors 241 and 247 of the main cavity 245a reflect optical signals at a selected wavelength to generate the LO signal. Each of the first and second optical reflectors 241 and 247 may be a simple mirror, a sampled DBR, a mirror realized through refractive index changes along an optical propagation direction, a variable position mirror, or a broadband mirror such as a photonic crystal mirror, for example. The main cavity 245a may form an on-chip SG-DBR laser, for example. In an embodiment, the first and second optical reflectors 241 and 247 may be configured to reflect multiple reflect waveforms having slightly different frequency comb lines, spaced at the same predetermined intervals, respectively. The optical signal aligns at one of the frequency comb lines, causing it to resonant in the main cavity 245a at the corresponding wavelength. The third optical reflector 248 of the coupling cavity 245b is configured to couple optical signals emitted from the main cavity 245a, and to provide a corresponding time-delayed optical signal back into the main laser cavity. The time-delayed injected optical signal helps adjust the phase of the main cavity 245a to improve the coherence properties of the on-chip laser, thus further reducing phase noise (and linewidth) of the LO laser 240. The third optical reflector 248 may be a band pass reflective mirror, a frequency selection filter or a diffraction grating, adjustable in longitudinal position for example, which may be tunable. Also, the third optical reflector 248 may be a broadband mirror, for example, which requires no tuning.

In the depicted embodiment, the phase controller 242, the active gain medium 243, the waveguide 244, and the beam directing element 246 are located within the coupling cavity 245b, and the phase controller 242 and the active gain medium 243 are also located within the main cavity 245a. It is understood that the various components of the LO laser 240 may be arranged on-chip or off-chip in alternative configurations, without departing from the scope of the present teachings. Also, the phase controller 242 may be positioned anywhere within the main cavity 245a (e.g., not necessarily between the active gain medium 243 and the first optical reflector 241). Generally, the phase controller 242 allows for phase adjustment in the extended hybrid cavity 245. The active gain medium 243 may be formed from the material of the chip 205, and provides optical gain of the reflected optical signal resonating in the extended hybrid cavity 245. The waveguide 244 may be a tilted waveguide interface at the edge of the chip 205, for example, configured to reduce back reflection from the chip edge. The chip edge may also be covered with an optically non-reflective coating to further reduce back reflection.

In the depicted embodiment, the beam directing element 246 is located off-chip, along with the third optical reflector 248. The beam directing element 246 may be a collimating lens, for example, that provides a collimated optical signal (beam of light) to the third optical reflector 248 and focuses reflected optical signal from the third optical reflector 248 back into the waveguide 244, as discussed above. The beam directing element 246 may be various alternative devices capable of directing the reflected optical signal into the waveguide 244, without departing from the scope of the present teachings. In an embodiment, the beam directing element 246 provides a tap for a wavelength reference, indicated by wavelength reference 171, discussed above.

Also as mentioned above, the reflected optical signal exits the extended hybrid cavity 245 as the LO signal through optical isolation section 150 into splitter 160. Optical isolation is provided through the use of non-reciprocal elements, as well-known in the art, relying on Faraday-effect or on non-reciprocal modal coupling. In the depicted embodiment, the splitter 160 is a three-way splitter, providing the LO signal to the first coupler 121, the second coupler 122, and an LO monitor output indicated by wavelength reference 172, discussed above.

The configuration of the extended hybrid cavity 245 allows linewidth reduction of the LO laser 240, which enables better performance of the optical coherent receiver 200 over conventional approaches, e.g., using integrated SG-DBR lasers. For example, FWHM linewidth may be reduced from about 10 MHz, common in conventional optical coherent receivers having integrated SG-DBR laser LOs, to about 100 kHz, providing reduction in phase noise of the LO laser 240.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A coherent optical receiver, comprising:
    a local oscillator (LO) laser configured to provide an LO signal, the LO laser comprising a hybrid cavity and an active gain medium within the hybrid cavity, the LO laser being defined between an interior first optical reflector on a chip including the active gain medium and an external second optical reflector not on the chip;
    a wavelength reference located on the chip and coupled to the LO laser to enable monitoring of the LO signal output by the LO laser for providing wavelength information for the hybrid external cavity;
    an optical coupling system on the chip configured to add an input optical signal and the LO signal from the LO laser to provide a plurality of combined optical signals, the optical coupling system comprising a 90 degree optical hybrid including a first multimode interference (MMI) coupler and a second MMI coupler;
    a plurality of photodetectors on the chip configured to detect a plurality of combined optical signals, respectively; and
    a three-way splitter configured to split the LO signal output by the LO laser among the first MMI coupler, the second MMI coupler and the wavelength reference,
    wherein the first MMI coupler is configured to add the input optical signal and the LO signal to provide the plurality of combined optical signals, and the second MMI coupler is configured to couple the plurality of combined optical signals with the plurality of photodetectors, respectively.

2. The coherent optical receiver of claim 1, wherein the second optical reflector is tunable.

3. The coherent optical receiver of claim 1, wherein the LO laser further comprises:

a beam directing element configured to focus optical signals reflected from the second optical reflector into a waveguide coupled to the active gain medium within the hybrid cavity.

4. The coherent optical receiver of claim 3, wherein the beam directing element is a collimating lens.

5. The coherent optical receiver of claim 3, wherein the LO laser further comprises:
a phase controller configured to enable phase adjustment in the hybrid cavity;
an optical isolation section formed on the chip between the first optical reflector and the optical coupling system, the optical isolation section being configured to reduce effects of optical feedback on the hybrid external cavity; and
a tilted waveguide interface formed at a edge of the chip between the active gain medium and the beam directing element, the tilted waveguide interface having an optically non-reflective coating for lowering edge reflection.

6. The coherent optical receiver of claim 1, wherein the first optical reflector comprises one of a sampled distributed Bragg reflector (DBR), a photonic crystal mirror, a displacement mirror, or a mirror realized through refractive index changes along an optical propagation direction.

7. The coherent optical receiver of claim Canceled 1, wherein the wavelength reference comprises a waveguide-based discriminator, a dielectric filter discriminator, molecular absorption cells, or atomic absorption cells.

8. The coherent optical receiver of claim 1, wherein the wavelength reference comprises one or more on-chip ring resonators, each having a prescribed resonant frequency.

9. A local oscillator (LO) laser of a coherent optical receiver comprising an optical coupling system for adding an input optical signal with an LO signal from the LO laser and a plurality of photodetectors, the LO laser comprising:
a semiconductor chip comprising an active gain medium of the LO laser;
a first optical reflector formed on the semiconductor chip;
a second optical reflector not on the semiconductor chip, the first and second optical reflectors defining a hybrid external cavity containing the active gain medium; and
a beam directing element located between the active gain medium and the second optical reflector, the beam directing element configured to focus optical signals reflected from the second optical reflector into a waveguide coupled to the active gain medium, enabling laser action to provide the LO signal to the optical coupling system;
wherein a wavelength reference formed on the semiconductor chip is coupled to the LO laser to enable monitoring of the LO signal output by the LO laser for providing wavelength information for the hybrid external cavity.

10. The LO laser of claim 9, further comprising:
a phase controller configured to enable phase adjustment in the hybrid external cavity;
an optical isolation section formed on the semiconductor chip between the first optical reflector and the optical coupling system, the optical isolation section being configured to reduce effects of optical feedback on the hybrid external cavity; and
a tilted waveguide interface formed at a edge of the chip between the active gain medium and the beam directing element, the tilted waveguide interface having an optically non-reflective coating for lowering edge reflection.

11. A coherent optical receiver, comprising:
a local oscillator (LO) laser configured to provide an LO signal, the LO laser comprising a main cavity, a coupling cavity, and an active gain medium within at least the main cavity,
wherein the main cavity is defined between first and second optical reflectors on a chip including the active gain medium, and
wherein the coupling cavity is defined by the first optical reflector on the chip and a third optical reflector not on the chip, the third optical reflector reflecting an optical signal coupled from the main cavity back into the main cavity after a time-delay.

12. The coherent optical receiver of claim 11, further comprising:
an optical coupling system on the chip configured to add an input optical signal and the LO signal from the LO laser to provide a plurality of combined optical signals; and
a plurality of photodetectors on the chip configured to detect the plurality of combined optical signals, respectively.

13. The coherent optical receiver of claim 12, wherein the LO laser further comprises:
a beam directing element configured to focus optical signals reflected from the third optical reflector into a waveguide within the coupling cavity coupled to the active gain medium within the main cavity.

14. The coherent optical receiver of claim 13, wherein the beam directing element provides a tap for a wavelength reference, enabling measurement of the LO laser.

15. The coherent optical receiver of claim 1, wherein the second optical reflector comprises one of a band pass reflective mirror, a broadband mirror or a diffraction grating.

* * * * *